A. LUZZATTI.
FOLDING SAW FRAME.
APPLICATION FILED OCT. 25, 1907.
923,543.
Patented June 1, 1909.
2 SHEETS—SHEET 1.
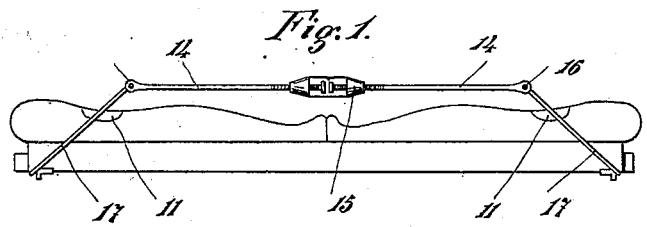
Fig. 1.
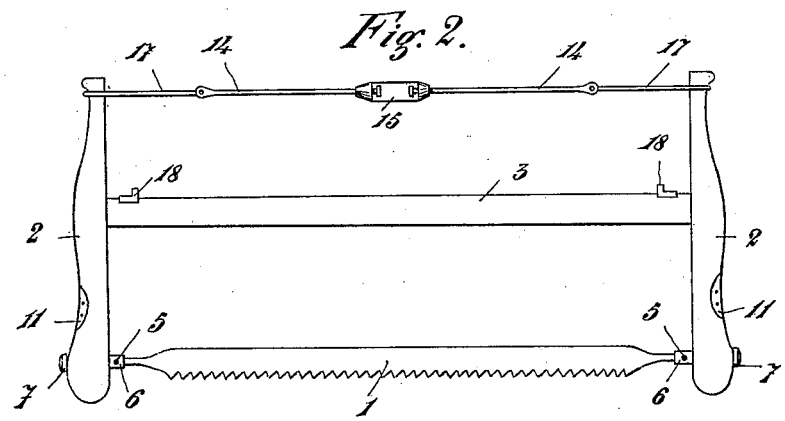
Fig. 2.
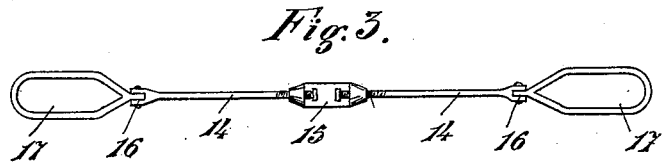
Fig. 3.
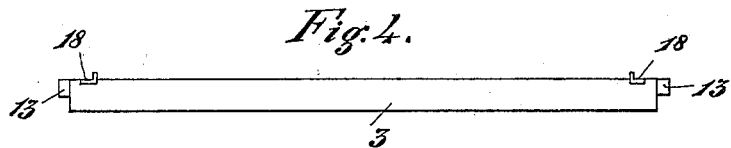
Fig. 4.
Fig. 5.
Witnesses
E. Barned
Walker H. Cook
Inventor
Arturo Luzzatti
per Herbert Sefton
Attorney.

A. LUZZATTI.
FOLDING SAW FRAME.
APPLICATION FILED OCT. 25, 1907.

923,543.

Patented June 1, 1909.
2 SHEETS—SHEET 2.

Witnesses.
E. D. Bartlett
Walter E. N. Pook

Inventor
Arturo Luzzatti
per: Herbert Leftwich Jones
Attorney

UNITED STATES PATENT OFFICE.

ARTURO LUZZATTI, OF RAVENNA, ITALY.

FOLDING SAW-FRAME.

No. 923,543.  Specification of Letters Patent.  Patented June 1, 1909.

Application filed October 25, 1907. Serial No. 399,183.

*To all whom it may concern:*

Be it known that I, ARTURO LUZZATTI, a subject of the King of Italy, residing at Ravenna, in the Kingdom of Italy, have invented a new and useful Saw in which a Toothed Blade is Mounted in a Folding Frame, of which the following is a specification.

The present invention relates to an improved construction of a frame saw of the kind in which the blade is mounted in a folding frame. The saw may be made of any suitable dimensions for use as a one or two-handed saw, or as a bench saw actuated in any convenient way, according to the nature of the work it is to do.

The characteristic feature of the present invention consists in the construction and arrangement of the three principal parts, namely, the blade, the brace bar, and the tension device, so that when taken apart the saw may be packed conveniently for transport. When in use the saw blade is stretched in its frame under suitable tension, while when not in use it can be packed up into a minimum space, with the blade perfectly protected without necessitating a sheath, which is of special importance in its applications for military purposes, as also when it is employed by Alpine climbers, cyclists, motorists, wood cutters, carpenters, joiners, etc.

One form of construction of the saw is shown by way of example in the accompanying drawing.

Figure 6:
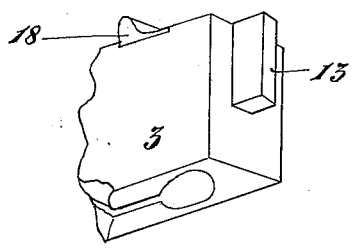
Figure 7:
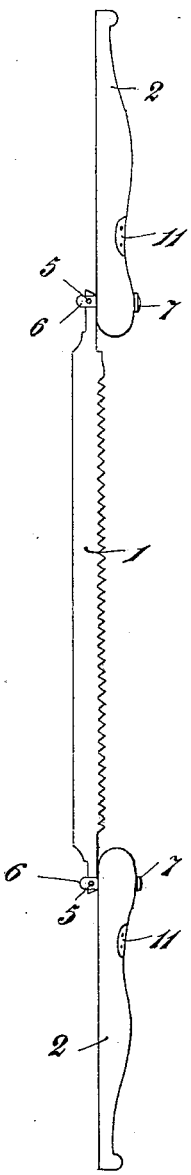
Figure 8:
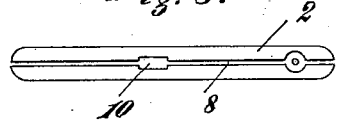
Figure 9:
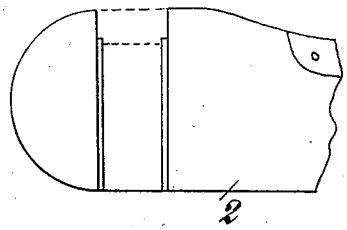
Figure 10:
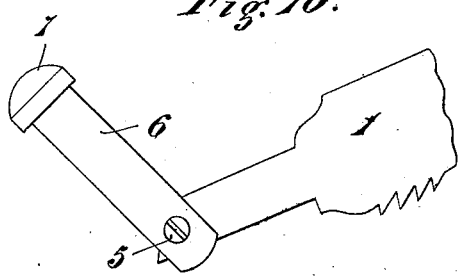

Figure 1 shows the saw dismounted and folded up for transport. Fig. 2 shows the saw stretched and arranged for use. Figs. 3 to 10 are detail views hereinafter referred to.

Referring to the drawings, 1 is the saw blade, 2 are the supports for the latter, 3 is the brace bar, and 4 is the screw tension device. Each end of the blade 1 is connected by a screw or pin 5 to a rod 6 engaging in a slot formed in one of the supports 2, Figs. 2 and 10. The rod 6 has a head 7 which engages against the face of the recessed portion in the support 2. The screw 5 may be easily removed for the replacement of the blade in case of necessity. Each rod 6 can slip freely in the slot of its support, but it cannot come out therefrom. In this way the blade 1, the rods 6 and the supports 2 form three linked members, seen spread out in Fig. 7.

The inner shoulder of each head piece 7 may be toothed or roughened in any convenient way so as to cause it to engage against a corresponding roughened surface forming the base of the depression wherein the head lies; in this way all movement of rotation of the saw 1 when stretched will be prevented.

In the inner face of each of the supports 2, which are usually of wood, formed in the manner well known in carpenters' saws, a longitudinal groove 8 (Fig. 8) is formed to a certain depth, and these grooves serve in combination with a groove 9 on the brace bar 3 (Fig. 5) to form a close casing for the blade 1 whichever way the toothed edge of the blade may be directed when the saw is folded up in the position for transport, Fig. 1. In the supports, slots are formed in a convenient position as shown at 10 for receiving spigots or projecting pieces 13 on the brace bar, the arrangement being the same at each end. The outer face of each of the supports is usually concave and is provided at one place with a metal clasp 11. The brace bar 3 is usually formed of a piece of wood of sufficient strength. The groove 9 formed in one face of the bar as above described is terminated at each end by a slot 12, (Fig. 5,) serving to receive a corresponding end of the pieces 6 when the saw is folded up. At the other side of the brace bar 2 angle pieces 18 usually of metal are supported preferably by being let into the wood and fixed by means of screws. These angle pieces serve as catches for the loops of the tension device when the saw is folded up, Fig. 1.

The tension device is formed of metal and comprises two rods 14 screw threaded at one end and engaging the sleeve 15 internally threaded with right and left hand screws. The other ends of the rods are formed with eyelets 16 in which loops 17 are engaged. The tension is adjusted by turning the sleeve 15 in one direction or the other, as will be well understood, the drawing together of the rods 14 serving to pull together the tops of the supports 2, thus tensioning the blade and making the whole saw ready for use.

What I claim is:

A folding frame saw comprising in combination a blade, short linked rods, each at one end pivotally attached to one end of said blade, enlarged heads on the other ends of said rods, supports adapted to engage the headed rods, and slotted and grooved to receive the blade when the saw is folded up; a brace bar detachably secured to the said supports and a detachable adjustable tension device adapted to engage the other ends of said supports; the whole so combined that the supports can be folded back, by means of the linked rods, upon one side of the saw blade, the detachable brace bar forming therewith a sheath for the saw-blade, and the whole be secured together by the looped ends 17 of the tension device passed over the ends of the supports and abutting against projections 18 on the brace bar.

In witness whereof I have hereunto set my hand in presence of two witnesses.

ARTURO LUZZATTI.

Witnesses:
　　LEOPOLDO DURANDO,
　　EGIDIO A. LARAIA DI ROCCO LARAIA.